United States Patent [19]

Ross et al.

[11] 4,254,153

[45] Mar. 3, 1981

[54] PROCESS FOR PREPARING FROZEN PAR-FRIED POTATOES

[75] Inventors: Nicholas D. Ross; George A. White, both of Moses Lake, Wash.; William L. Allinson, Manhattan Beach, Calif.

[73] Assignee: Carnation Company, Los Angeles, Calif.

[21] Appl. No.: 29,608

[22] Filed: Apr. 13, 1979

[51] Int. Cl.³ .............................................. A23L 1/216
[52] U.S. Cl. ................................... 426/441; 426/444; 426/464; 426/637
[58] Field of Search ............... 426/637, 438, 441, 444, 426/456, 464, 482, 509, 510, 518, 524, 445, 808

[56] References Cited

U.S. PATENT DOCUMENTS

| | | | |
|---|---|---|---|
| Re. 23,890 | 11/1954 | Chase | 426/444 X |
| Re. 23,891 | 11/1954 | Chase | 426/444 X |
| 3,397,993 | 8/1968 | Strong | 426/441 |
| 3,634,095 | 1/1972 | Willard | 426/808 X |
| 3,649,305 | 3/1972 | Wilder | 426/441 X |
| 3,973,047 | 8/1976 | Linaberry et al. | 426/456 X |

FOREIGN PATENT DOCUMENTS 636173 2/1962 Canada ..................................... 426/444
996813 9/1976 Canada .

OTHER PUBLICATIONS

Talburt et al., *Potato Processing*, 1967, pp. 340-373.

*Primary Examiner*—Arthur L. Corbin
*Attorney, Agent, or Firm*—Eugene C. Ziehm; Robert D. Kummel

[57] ABSTRACT

A process for preparing frozen par fried potatoes which, when finish fried, have a crisp surface texture and a mealy internal core, and remain crisp and rigid for extended periods of time after finish frying. Potatoes which have been peeled, trimmed, cut into strips and blanched, are subjected to a two stage drying procedure, in which the strips are first exposed to high velocity ambient air for a period of time sufficient to reduce their weight by about 8%–15%, and are then dried in circulating heated air to further reduce the weight of the strips by an additional 8%–15%. After drying, the potato strips are maintained in a quiescent state for a short period of time to permit equialization of moisture distribution in the strips, and are then par-fried, frozen and packaged.

7 Claims, No Drawings

PROCESS FOR PREPARING FROZEN PAR-FRIED POTATOES

BACKGROUND OF THE INVENTION

This invention relates to the production of partially fried, frozen potato strips, which when finish fried provide french fries having improved textural characteristics. More particularly, the invention relates to a process for producing frozen par-fried potatoes which remain crisp and rigid for extended periods of time after finish frying.

A sizeable market has developed in recent years in the institutional food trade such as restaurants, fast food stores and the like, for frozen, partially fried potato strips which require only a brief period of further cooking before serving. Such potato products, which are generally referred to as par-fries, are produced by peeling, cutting and trimming raw potatoes into strips of a suitable size, which are blanched in steam or hot water to partially cook the potatoes. The blanched strips are then partially fried (par-fried) in hot fat or oil and are frozen. Such frozen par-fries are prepared for consumption by finish frying in deep fat or oil for a short period of time, usually about 1–3 minutes. The use of such frozen par fry potato strips offers convenience and savings in labor costs, since they need only be removed from the package and finish fried for a short time, thereby eliminating the necessity for washing the potato, peeling, cutting it into strips and frying for extended periods of time, as is required when french fries are prepared from raw potatoes. However, par fried potato strips available heretofor commonly suffer from the disadvantage that when prepared for consumption they are unstable as to texture. Thus, immediately after finish frying, the potato strips have a desirable crisp texture, but become limp and soggy within a few minutes after preparation. Such limpness of the french fries results in objectionable appearance, taste and texture and is a primary feature by which consumers identify a poor product.

A number of solutions have been proposed in order to improve the crispness and rigidity of par-fried potatoes after finish frying. For example, the surface treatment of potato strips with firming agents such as modified starches, gums, alginates, calcium salts, and the like has been suggested to improve the crispness of the strips after finish frying. The results obtained by such surface treatment procedures, however, have been successful to only a limited degree and vary with the condition of the raw potatoes used. As a result, control of surface crispness and rigidity of the finished fries is largely dependent upon the quality of the raw potato, which varies throughout the year, and may be seriously affected during the production of the par-fried potato strips. U.S. Pat. No. 3,397,993 discloses a process for producing frozen par fried potato strips in which the strips are first blanched to a translucent condition and are then dried in hot air (150°–350° F.) to remove between 20%–30% moisture prior to par frying and freezing. U.S. Pat. No. 3,649,305 discloses a process in which potato strips are dried in hot air (150°–350° F.) to remove between 10%–30% moisture, after which the strips are blanched, par fried and frozen.

The present invention provides a process for the production of par-fried potato strips which have a crisp surface layer and a mealy inner core after finish frying and which retain their surface crispness and rigidity for an extended period of time after finish frying. In addition the present process provides a significant savings in the amount of energy required to produce the product, as compared to prior art procedures which involve drying of the potato strips in hot air prior to par frying.

SUMMARY OF THE INVENTION

In accordance with the present invention, raw potatoes are washed, peeled, trimmed, and cut into french fry sized strips in the usual manner. The raw potato strips are then blanched, to inactivate enzymes and partially cook the potato strips, by conventional procedures, such as by using hot water or steam. Upon completion of blanching, the strips are dehydrated in a two stage drying procedure. In the first step of this drying procedure, the blanched strips are exposed to a stream of high velocity ambient air for a period of time, typically 5–30 minutes, to remove sufficient moisture to reduce the weight of the strips by about 8%–15%. Both surface moisture and internal moisture are removed from the strips during such contact of the strips with high velocity ambient air. The strips are then subjected to drying in heated air to further reduce the moisture content of the strips by about 8%–15% by weight, with the total moisture loss in both drying steps being about 18%–26% by weight.

After hot air drying, the strips are allowed to remain in a quiescent state, subjected to minimal air movement, for a short period of time, to equalize the distribution of moisture in the strips. During this period moisture from the core of the strips diffuses into the outer surfaces, to provide substantially uniform distribution of moisture in the strips. Thereafter the strips are immersed in a deep fat fryer to further reduce their moisture content and to partially fry the strips. The par-fried strips are then frozen and packaged.

The frozen par-fried potato strips thus produced are prepared for consumption by finish frying in a deep fat or oil bath for a short period of time, for example 1.5 to 3.5 minutes, at a temperature of about 300° F.–375° F. The resulting french fried potato strips have a superior texture, crispness, taste and color, having a crisp, rigid surface layer and a mealy inner core. In addition, the french fries thus prepared retain their crispness and rigidity for extended periods of time after finish frying, without becoming limp and soggy.

DETAILED DESCRIPTION OF THE INVENTION

In the practice of this invention, raw potatoes are first subjected to the usual preliminary steps of washing, peeling and trimming. In order to achieve the desired end product, that is, par-fried potato strips which retain surface crispness and rigidity for an extended period of time after finish frying, it is generally preferred that the raw potatoes have a relatively high solids content, that is, about 20% or higher. However, potatoes having a lower solids content, for example between about 18% and 20%, may also be used in the present invention. After trimming, the potatoes are cut into strips which may be from about ¼ to ½ inch square in cross-section, or into larger cuts such as ½ inch by ¾ inch in size.

The strips thus obtained are blanched according to conventional procedures in order to inactivate enzymes which cause discoloration in potato solids, to leach sugars from the strips and to partially cook the potato strips. While the time and temperature of blanching may be adjusted to variations in the raw potatoes, typically the strips are blanched by immersion in hot water, at about 160° F.–210° F., for 2–15 minutes, with a temperature of 170° F.–190° F., for 4–9 minutes being preferred. Alternatively, the potato strips may be blanched in steam, at atmospheric pressure, for about 2–10 minutes. If desired, the sugar content of the potato strips may be adjusted for color control by well-known procedures at this point in the process.

After blanching, the potato strips are dehydrated in a two stage drying procedure to remove sufficient moisture to reduce the weight of the potato strips by about 18%–26%. Thus, the blanched potato strips are carried, such as on an endless screen conveyor belt, through a two stage drying unit in which the strips are first carried through an ambient air drying section and then through a hot air drying section. In the first or ambient air drying section, the strips are contacted with high velocity, circulating ambient air for a period of time sufficient to remove from the strips about 8% to 15% by weight moisture, preferably between about 9% and 12%. As used herein, the term "ambient air" means air having a temperature of approximately the same as the air in the production facility surrounding the drying unit. Generally this air will be at a temperature of about 70° F. to 75° F., but may be slightly higher, for example up to about 90° F., at times, such as during summer months, if the production facility for the product of this invention is located in an area in which high outside temperatures are encountered. Ambient air is used in this initial drying step in order to effect slow removal of moisture from the potato strips. Such inital slow removal of moisture from the strips is essential in the process of the present invention.

In accordance with a preferred embodiment of the invention, the blanched strips are deposited as a continuous stream on an endless screen conveyor belt and form on the belt a loosely laid bed of potato strips having a thickness of about 2–8 inches, preferably about 4–5 inches. As the bed of potato strips is carried through the ambient air drying section, ambient air is blown downwardly through the bed at a rate of about 200–400 feet per minute face velocity, preferably between about 250–300 feet per minute face velocity, to facilitate removal of moisture from the strips, with substantially all of the surfaces of the strips being contacted by the high velocity ambient air. Ambient air drying of the strips is continued until sufficient moisture has been removed from the potato strips to reduce the weight of the strips by about 8% to 15%. Of the moisture loss effected during this ambient air drying of the strips, about 3%–5% is surface moisture with the remainder being internal moisture loss.

The period of time the strips are in contact with the high velocity ambient air in order to effect the desired moisture loss in the initial drying step will of course depend on a number of factors, such as the initial moisture content of the potatoes, the temperature of the air, the velocity of the air flow, the degree of saturation of the air and the like, and can be readily established. Typically the potato strips are contacted with 70° F. air for 5–30 minutes in order to effect the desired moisture loss.

Upon completion of the ambient air drying step, the potato strips are then further dehydrated in a second drying step by subjecting them to high velocity heated air to further reduce their moisture content. In this second drying step the strips are contacted with hot air having a temperature of between about 170° F. to 230° F., for 4–20 minutes, preferably 190° F.–210° F., for 8–10 minutes, to further reduce the weight of the potato strips by moisture loss by an additional 8%–15%, preferably 12%–14%. Thus the bed of strips is carried on the conveyor belt from the ambient air drying section into the hot air drying section where hot air having a flow velocity about the same as in the ambient air drying section, is blown downwardly through the bed so that all surfaces of the strips are contacted by the heated air. If lesser amounts of moisture are removed or substantially lower air temperatures are used in this step, the strips, when finish fried, will not develop the desired crispness and rigidity characteristics. The removal of more than about 15% moisture in this second drying step is to be avoided since it results in the strips being over dried which promotes blistering of the surfaces of the strips during the par fry step and the production of french fries having an extremely leathery surface layer.

Upon completion of the hot air drying step, the potato strips are maintained in a quiescent state for a short period of time, usually about 4 to 6 minutes, to facilitate equalization of moisture distribution in the strips. During this period, the strips are subjected to minimal air movement, with moisture from the interior of the strips migrating to the outer surfaces. In this manner the distribution of moisture between the core and the outer surfaces of the strips becomes more uniform to facilitate additional moisture removal during frying and to prevent expansion of the core and blistering of the outer surfaces of the potato strips during deep fat frying. Preferably, the bed of potato strips is maintained in a quiescent state in an enclosed space in which there is little, if any, air movement. While no attempt is made to heat the air in this enclosed space, this temperature may rise to about 140° F., or higher due to the sensible heat of the potato strips being processed therein. According to one embodiment, the bed of potato strips is carried on the endless conveyor from the hot air drying unit through an enclosed unheated unit in which the strips are kept for about 4 to 6 minutes to permit such uniform moisture distribution in the strips.

Thereafter, the potato strips are par-fried by immersing them in a deep fat fryer for a short period of time, for example 20 to 90 seconds at a fat temperature of about 325° F.–390° F. During par-frying, additional moisture is removed from the strips, so that upon completion of par-frying, the potato strips have a solids content of between about 30%–40%, preferably 33%–38%.

After par-frying, the strips are frozen by cooling them to a temperature of about 0° F. to 25° F., by conventional procedures such as on a continuous belt freezer in a freezing tunnel.

When the par-fried strips are prepared for consumption they are finish fried, from the frozen state, in deep fat for about 1½ to 3½ minutes at a temperature of about 300° F., to 375° F., to develop color and crispness.

The potato strips, after finish frying, have a crisp, rigid surface which is golden brown in color and a mealy internal texture with improved mealiness, without excessive separation between the core and the outer surfaces. French fries prepared from the par-fried strips of this invention retain these internal and external texture characteristics for extended periods of time after finish frying, without becoming limp and soggy. This enables the restaurant or fast food outlet to finish fry the par fries in advance and hold them for extended periods of time until needed, without any significant adverse effect on the texture of the french fries served to its customers.

The two stage drying procedure of the present invention, in addition to providing a product having superior internal and external texture characteristics for extended periods of time after finish frying, also enables frozen par fries to be produced with considerably less energy consumption than is required in the production of frozen par fries in which only a single hot air drying step is used. Thus, the removal of a total of 18%–26% moisture, when carried out in a two stage drying procedure in which the strips are first contacted with high velocity ambient air to remove about 8%–15% moisture and are then contacted with hot air (190° F.–210° F.) to remove an additional 8%–15% moisture, requires about 25%–30% less energy than is required to remove an equivalent amount of moisture in a single stage, hot air dryer. This reduction in energy consumption provides the process of the present invention with a distinct economic advantage over the procedures used heretofor.

The invention is further demonstrated by the following examples.

EXAMPLE I

A random sample of Russet Burbank variety potatoes, having an average specific gravity of 1.075, was washed, peeled, trimmed and cut into strips approximately 11/32" square in cross-section. The resulting raw potato strips were then blanched by immersion in hot water (181° F.) for a period of 7–8 minutes. After blanching, the strips were drained and placed on a screen as a loosely laid bed of strips. High velocity ambient air (72° F.) was blown downwardly through the strips for a period of 12 minutes, with the resultant weight loss of the potatoes being 10.4%. The potato strips were then contacted with a stream of hot air (200° F.) for a period of 15 minutes to further reduce the weight of the potatoes by 14%, for a total moisture loss of 24.4%. Upon completion of hot air drying, the strips were maintained in a quiescent state for about 4 minutes during which time the strips were subjected to minimal air movement. Thereafter the potato strips were par fried in hot oil (360° F.) for 45 seconds and were then frozen. The par fried strips thus produced had a solids content of 37.6%. Thereafter the frozen strips were placed in a frying basket and immersed in a deep fat frying bath and were finish fried at 360° F. for 2¾ minutes. The resulting french fried potato strips had a crisp outer surface and a mealy internal core. As the product cooled, these characteristics were maintained, with the strips remaining crisp and rigid, and exhibited no evidence of limpness or sogginess.

In order to provide a basis for comparison, a second batch of french fried potatoes was prepared according to conventional procedures. That is, the raw potato strips were blanched, par fried, frozen and finish fried using the same procedure and conditions as was used in processing the first batch of strips. However, the strips were not subjected to drying prior to the par-fry step. The resulting finish fried strips were crisp when removed from the fryer, but after 3 minutes began to exhibit undesirable limp and soggy units.

EXAMPLE II

A quantity of Russet Burbank variety potatoes, having an average specific gravity of 1.078, was washed, peeled, trimmed and cut into strips about ¼ inch square inch cross-section, using conventional procedures. The potato strips were then blanched at 176° F. for seven minutes by immersion in hot water. The blanched strips were drained and subjected to a two stage drying procedure in which a loose bed of the strips was first contacted with a stream of ambient air (73° F.) for eight minutes, which reduced the weight of the strips by about 9%, and the bed of strips was then subjected to a stream of hot air (200° F.) for eleven minutes to further reduce the weight of the strips by an additional 13%. After hot air drying, the strips were allowed to remain in a quiescent state for 5 minutes after which they were par fried in hot oil (360° F.) for 30 seconds and then frozen. The par fried strips had a solids content of 36.1%. The frozen strips were subsequently finish fried in hot oil (340° F.) for 2¼ minutes. The resulting french fried potato strips exhibited a crisp but tender shell, free of a leathery, tough character. This characteristic shell remained as the strips cooled.

What is claimed is:

1. A process for preparing frozen par-fried potato strips which consists essentially of
   peeling, trimming and cutting potatoes into strips,
   blanching the potato strips,
   dehydrating said strips by first contacting them with circulating ambient air for a period of time sufficient to reduce the weight of the strip by about 8% to 15%, through the loss of both surface moisture and internal moisture from the strips and then contacting the strips with circulating heated air to further reduce the weight of strips by about 8% to 15%, with the total weight loss of the strips during the ambient air drying and the hot air drying being between about 18% to 26%,
   equalizing the distribution of moisture in the strips,
   par-frying said potato strips in a deep fat bath for about 20 to 90 seconds at a temperature of about 325° F. to 390° F., so that the par-fried strips have a solids content of about 30%–40% by wt., and
   freezing the par fried potato strips, whereby the frozen strips when finish fried have a crisp, rigid surface and a mealy internal texture, with the strips remaining crisp and rigid for extended periods of time after finish frying.

2. The process defined in claim 1 in which the ambient air with which the strips are first contacted is at a temperature of about 70° F.–75° F., with the strips being maintained in contact with the ambient air for 5–30 minutes.

3. The process defined in claim 1 in which the blanched strips are deposited on a porous support as a loose bed of potato strips, the bed having a thickness of about 2–8 inches, and ambient air is blown through said bed of strips at a rate of about 200–400 feet per minute face velocity.

4. The process defined in claim 3 in which the strips are contacted with heated air by blowing air, having a temperature of about 170° F.–230° F., through the bed of strips at a rate of about 200–400 feet per minute face velocity.

5. The process defined in claim 1 in which the heated air with which the strips are contacted is at a temperature of about 170° F.–230° F., with the strips being maintained in contact with the heated air for about 4–20 minutes.

6. The process defined in claim 1 in which the moisture distribution in the strips is equalized by maintaining the strips in a quiescent state for about 4 to 6 minutes during which the strips are subjected to minimal air movement.

7. The process defined in claim 1 in which said blanching of the potato strips is performed in a single stage blanching step by contacting the strips with hot water for 2 to 15 minutes or steam for about 2–10 minutes.

* * * * *